United States Patent
Iwasawa

(10) Patent No.: US 12,164,090 B2
(45) Date of Patent: Dec. 10, 2024

(54) IMAGING APPARATUS AND MOVING BODY

(71) Applicant: TAMRON CO., LTD., Saitama (JP)

(72) Inventor: Yoshito Iwasawa, Saitama (JP)

(73) Assignee: Tamron Co., Ltd., Saitama (JP)

( * ) Notice: Subject to any disclaimer, the term of this patent is extended or adjusted under 35 U.S.C. 154(b) by 116 days.

(21) Appl. No.: 17/973,025

(22) Filed: Oct. 25, 2022

(65) Prior Publication Data

US 2023/0139669 A1    May 4, 2023

(30) Foreign Application Priority Data

Oct. 29, 2021 (JP) ................................ 2021-177146

(51) Int. Cl.
*G02B 15/14* (2006.01)
*H04N 23/959* (2023.01)

(52) U.S. Cl.
CPC . *G02B 15/143105* (2019.08); *G02B 15/1425* (2019.08); *H04N 23/959* (2023.01)

(58) Field of Classification Search
None
See application file for complete search history.

(56) References Cited

U.S. PATENT DOCUMENTS

| | | | |
|---|---|---|---|
| 2011/0020785 A1* | 1/2011 | Lowery, Jr. | G16H 50/80 436/526 |
| 2017/0114974 A1* | 4/2017 | Nishimura | F21S 41/322 |
| 2019/0094026 A1* | 3/2019 | Jungwirth | G02B 13/16 |
| 2019/0238556 A1* | 8/2019 | Winkle | H04L 9/32 |
| 2019/0302432 A1* | 10/2019 | Iwasawa | G02B 15/177 |
| 2020/0103905 A1* | 4/2020 | Gurin | G05D 1/0287 |
| 2020/0314347 A1 | 10/2020 | Kageyama et al. | |

FOREIGN PATENT DOCUMENTS

JP    2019-174848 A    10/2019
WO   WO 2018/003501 A1   1/2018

* cited by examiner

*Primary Examiner* — Eileen M Adams
(74) *Attorney, Agent, or Firm* — Paratus Law Group, PLLC

(57) ABSTRACT

A situation grasping means configured to grasp a situation of a moving body, an optical system mounted on the moving body, and a focusing group configured to change an imaging position of the optical system are provided, and the imaging position is changed to a position calculated from a setting value for setting the imaging position according to a situation of the moving body and a situation of the moving body grasped by the situation grasping means, and the optical system satisfies a predetermined conditional expression. Furthermore, the moving body includes the imaging apparatus.

11 Claims, 9 Drawing Sheets

IMAGING APPARATUS AND MOVING BODY

CROSS-REFERENCE TO RELATED APPLICATIONS

This application is based on and claims the benefit of priority from Japanese Patent Application No. 2021-177146, filed on Oct. 29, 2021, the entire contents of which are incorporated herein by reference.

BACKGROUND OF THE INVENTION

Technical Field

The present invention relates to an imaging apparatus and a moving body, and more particularly to an imaging apparatus suitable for being mounted on a moving body and a moving body including the imaging apparatus.

Related Art

In recent years, an imaging apparatus for obtaining surrounding information has been mounted on a moving body such as a vehicle. In addition, an imaging apparatus for imaging the surroundings is mounted on a moving body such as an unmanned aerial vehicle. These imaging apparatuses have been required to obtain various types of information in order to obtain objective information or favorably image an imaging target. Therefore, an optical system is required to have high resolution performance while maintaining small size and light weight. In addition, since an imaging environment for an imaging apparatus mounted on a moving body greatly changes according to movement of the moving body, high durability is also required.

As an optical system of an imaging apparatus mounted on a moving body such as a vehicle, for example, there has been proposed an optical system that includes a first lens group having negative refractive power and a subsequent lens group, and satisfies a condition of a resin lens while including the resin lens, so that good optical performance can be secured even when a temperature environment changes (see "JP 2019-174848 A").

For example, a solid state image sensor has been proposed in which phase difference detection pixels are provided in a block including a plurality of pixels, and the phase difference detection pixels are disposed at positions corresponding to each other in two or more blocks, whereby deterioration of a captured image can be suppressed (see "WO 2018/003501 A").

SUMMARY OF THE INVENTION

The optical system disclosed in JP 2019-174848 A realizes an optical system capable of securing good optical performance even when the temperature environment changes, but the optical system disclosed in JP 2019-174848 A has a strong restriction on power arrangement, which is not preferable in terms of high performance.

The image sensor disclosed in WO 2018/003501 A realizes a solid state image sensor capable of suppressing deterioration of a captured image while including a phase difference detection pixel. However, when the phase difference detection is performed by the solid state image sensor disclosed in WO 2018/003501 A, the focusing group is moved after the detection, which is not preferable in terms of speeding up the focusing. In addition, moving the focusing group according to the distance to the subject is not preferable in terms of durability because the focusing operation increases in a situation where the moving body is moving.

An object of the present invention is to provide an imaging apparatus that is suitable for an imaging apparatus mounted on a moving body and has high performance and high durability.

In order to solve the above problems, an imaging apparatus according to the present invention includes a situation grasping means configured to grasp a situation of a moving body, an optical system mounted on the moving body, and a focusing group configured to change an imaging position of the optical system, and changes an imaging position to a position calculated from a setting value for setting an imaging position according to a situation of the moving body and a situation of the moving body grasped by the situation grasping means, and the optical system satisfies a following conditional expression:

$$0.20 < |(1-\beta f^2) \times (\beta r^2)| < 12.00 \tag{1}$$

where $\beta f$ is a lateral magnification of the focusing group, and $\beta r$ is a lateral magnification of the lens group closer to the image than the focusing group.

In order to solve the above problems, a moving body according to the present invention includes the imaging apparatus described above.

According to the present invention, it is possible to provide an imaging apparatus that is suitable for an imaging apparatus mounted on the moving body and has high performance and high durability and a moving body.

DESCRIPTION OF THE EMBODIMENTS

Figure 1:
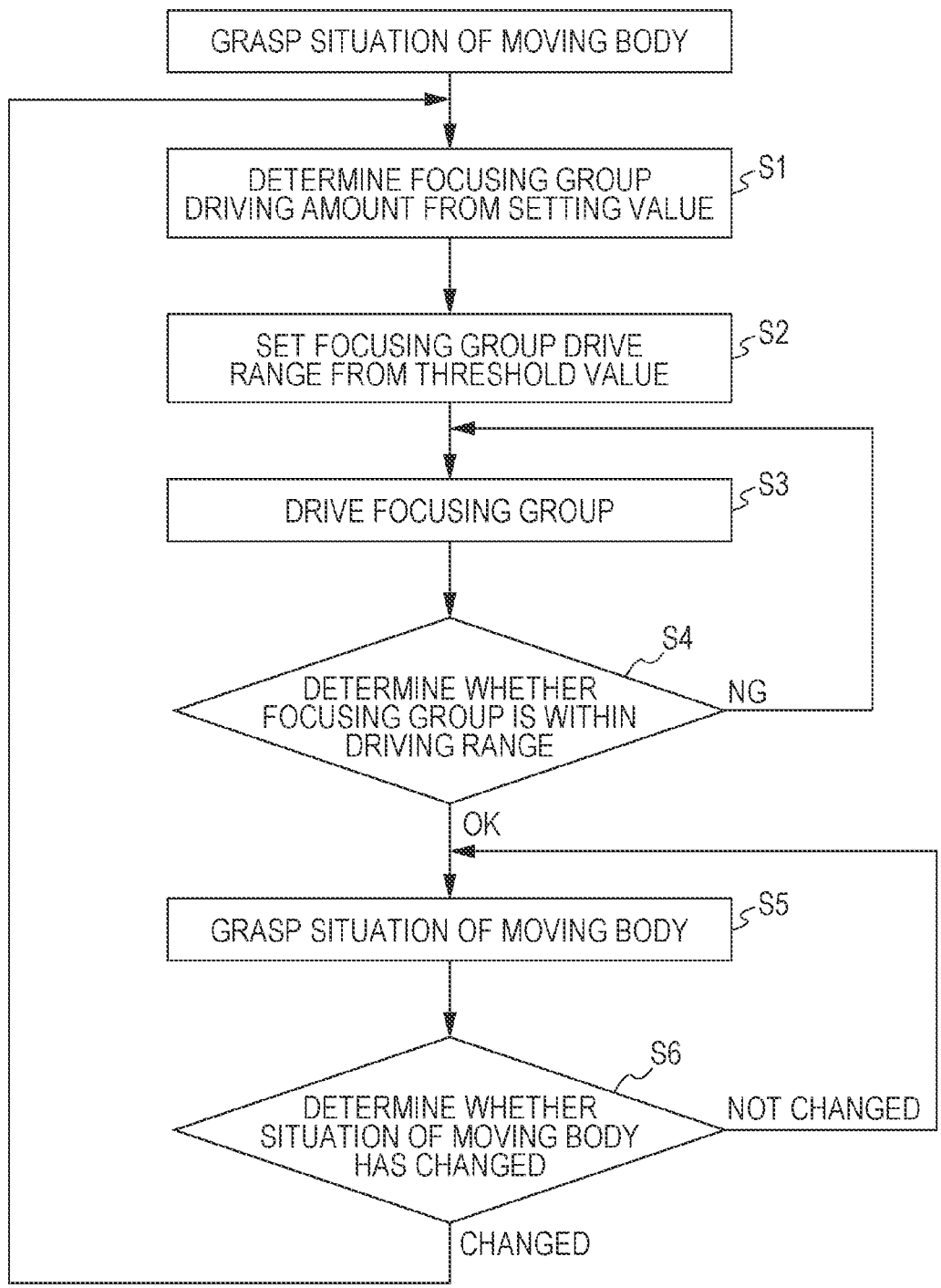
FIG. 1 is a flowchart illustrating an example of focusing group driving according to the present invention.

Hereinafter, embodiments of an imaging apparatus and a moving body according to the present invention will be described.

1. Moving Body

First, an embodiment of a moving body according to the present invention will be described. The moving body according to the present invention is a device on the premise of movement such as a vehicle, an aircraft, an artificial satellite, a ship, and the like regardless of manned or unmanned, and includes a self-sustaining navigation robot and the like.

The moving body is, for example, a vehicle, an aircraft, an artificial satellite, a ship, an autonomous navigation robot, or the like, and thus, greatly changes in an imaging situation unlike an imaging apparatus such as a camera such as a single-lens reflex or a mirrorless camera or a camcorder that captures an image while being held by a person, or a monitoring camera installed in a state of being fixed at a predetermined position. An object of the present invention is to ensure high resolution performance even when a change in an imaging situation greatly changes. Therefore, in the present application, a person is not included in a moving body, and an imaging apparatus used in a mode of capturing an image while being held by a person is not included in the imaging apparatus mounted on the moving body referred to in the present application.

2. Situation Grasping Means

In the present invention, the situation grasping means is a means configured to grasp the situation of the moving body, and can include, for example, a control device such as a CPU to be described later. The condition of the moving body to be grasped is preferably the speed of the moving body. A means configured to grasp the speed of the moving body may be achieved by measuring the speed using a vehicle speed sensor, a wheel rotation sensor, or detecting dynamic pressure using a pitot static pressure tube, further a GPS or the like, but a specific means is not restricted.

In addition, the condition of the moving body to be grasped is preferably the temperature of the moving body. A means configured to grasp the temperature of the moving body may be achieved by measuring the temperature by measurement of a thermistor electric resistance value, a method using the Seebeck effect, measurement of infrared radiation, or the like, but a specific means is not restricted.

In addition, the condition of the moving body to be grasped is preferably the altitude of the moving body. A means configured to grasp the altitude of the moving body may be achieved by measuring the altitude by measurement of the atmospheric pressure, measurement of the reflection time from the object using radio waves or a laser, a GPS or the like, but a specific means is not restricted.

In addition, it is preferable that the grasped situation of the moving body is the orientation of the moving body with respect to the optical axis of the optical system. A means configured to grasp the orientation of the moving body with respect to the optical axis of the optical system may be achieved by using information from an angular velocity sensor or a gimbal for holding the optical system, but a specific means is not restricted.

2-1. Status Recognition Content and Setting Value

In a case where the situation of the moving body grasped by the situation grasping means is the speed, for example, it is preferable to set the imaging position of the optical system as follows. For example, important information in a moving body moving at a low speed is often in a range close to the moving body. In addition, important information in a moving body moving at a high speed is often in a range far from the moving body. Therefore, it is preferable to hold data such as the position of the focusing group corresponding to the speed of the moving body, the imaging distance corresponding to the speed of the moving body, the amount of power corresponding to the speed of the moving body, or the like as the setting value. The imaging position can be changed from the setting value. The driving state of the focusing group can be calculated based on the setting value, and the focusing group can be driven to the calculated driving state. As described above, the data may be any data for changing the imaging position corresponding to the speed of the moving body, and the specific content of the data is not restricted.

Furthermore, in a case where the situation of the moving body grasped by the situation grasping means is the temperature of the moving body, for example, it is preferable to set the imaging position of the optical system as follows. The optical system and the lens barrel for holding the optical system change an imaging position according to a change in temperature. Therefore, it is preferable to hold data such as the position of the focusing group corresponding to the temperature of the moving body, the imaging distance corresponding to the temperature of the moving body, the amount of power corresponding to the temperature of the moving body, or the like as the setting value. The imaging position can be changed from the setting value. The driving state of the focusing group can be calculated based on the setting value, and the focusing group can be driven to the calculated driving state. As described above, the data may be any data for chancing the imaging position corresponding to the temperature of the moving body, and the specific content of the data is not restricted.

Furthermore, in a case where the situation of the moving body grasped by the situation grasping means is the altitude of the moving body, it is preferable to set the imaging position of the optical system as follows. For example, important information in a moving body moving at a low altitude is often in a range close to the moving body. In addition, important information in a moving body moving at a high altitude is often in a range far from the moving body. Therefore, it is preferable to hold data such as the position of the focusing group corresponding to the altitude of the moving body, the imaging distance corresponding to the altitude of the moving body, the amount of power corresponding to the altitude of the moving body, or the like as the setting value. The imaging position can be changed from the setting value. The driving state of the focusing group can be calculated based on the setting value, and the focusing group can be driven to the calculated driving state. As described above, the data may be any data for changing the imaging position corresponding to the speed of the moving body, and the specific content of the data is not restricted.

Furthermore, in a case where the situation of the moving body grasped by the situation grasping means is the orientation of the moving body with respect to the optical axis of the optical system, it is preferable to set the imaging position of the optical system as follows. In a case where the optical axis of the optical system is directed in an oblique direction and a lateral direction with respect to the traveling direction of the moving body in the moving body such as the vehicle, important information is often in a range close to the moving body. In addition, in a case where the optical axis of the optical system is directed in an oblique direction and the same direction with respect to the traveling direction of the flight vehicle moving at a high altitude, important information is often in a range far from the moving body. Therefore, it is preferable to hold data such as the position of the focusing group corresponding to the orientation of the moving body with respect to the optical axis of the optical system, the imaging distance corresponding to the orientation of the moving body with respect to the optical axis of the optical system, the amount of power corresponding to the orientation of the moving body with respect to the optical axis of the optical system, or the like as the setting value. The imaging position can be changed from the setting value. The driving state of the focusing group can be calculated based on the setting value, and the focusing group can be driven to the calculated driving state. As described above, the data may be any data for changing the imaging position corresponding to the orientation of the moving body with respect to the optical axis of the of the optical system, and the specific content of the data is not restricted.

By grasping the situation of the moving body as described above, it is possible to change the driving state of the focusing group so as to obtain the imaging position according to the situation of the moving body. That is, even when there is no subject information, it is possible to reduce the deviation between the imaging face and the imaging position. By driving the position of the focusing group to a more preferable state before obtaining the information about the subject, it is possible to obtain a high-resolution image at high speed. In addition, the number of times of driving the focusing group can be reduced as compared with the method of optimizing the position of the focusing group while obtaining the information of the subject. Therefore, high durability can be secured.

3. Threshold Value

In the present invention, the threshold value is data for limiting the drive range of the focusing group for changing the imaging position of the optical system according to the situation of the moving body. The drive range of the focusing group refers to a movable range of the focusing group, a voltage amount given to a driving means (for example, a motor (not illustrated) or the like) for moving the focusing group, a position of the focusing group, or the like, a variation amount of an image plane calculated from focus sensitivity, and the like. The threshold value is a value associated in advance with an assumed situation of the moving body, and can be an updatable value as appropriate. The threshold value may be updated by deep learning. Then, the drive range of the focusing group can be set from the actual situation of the moving body measured by the situation grasping means and the threshold value.

The present invention can drive a focusing group even without subject information, but the present invention may be applied to an imaging apparatus having an autofocus function to set a drive range of the focusing group. In a case where the subject is focused by an autofocus function such as phase difference AF or contrast AF, it is possible to limit the setting of the imaging position and the drive range of the focusing group by grasping the situation of the moving body by the situation grasping means. Consequently, the driving control of the focusing group can be performed efficiently, the driving amount of the focusing group can be reduced, and as a result, high durability can be secured.

Furthermore, in a case where the subject is focused using an autofocus function such as phase difference AF or contrast AF, when there is an unnecessary subject such as dust between the moving body and the subject or dirt on the windshield, there is a possibility that the unnecessary subject is focused. Therefore, even in a case where the subject is focused while obtaining the information about the subject by these autofocus functions, by applying the present invention and setting the drive range of the focusing group, it is possible to limit the drive range of the focusing group and avoid focusing on an unnecessary subject. This makes it possible to obtain important information to be acquired around the moving body with high resolution.

When the driving amount of the focusing group is changed, a drive error of the focusing group may occur, and the focusing group may not be driven to an assumed position. Therefore, by setting the drive range of the focusing group, it is possible to issue an instruction for correcting the drive deviation of the focusing group due to the drive error. Also in this case, since information on the subject is not required in the present invention, it is possible to change the imaging position with low power and a minimum driving amount. Therefore, necessary information can be obtained with high resolution, and higher durability can be secured.

Here, it is necessary to determine whether the driving amount of the focusing group deviates from the target driving amount. Therefore, in order to more effectively limit the drive range of the focusing group, it is preferable to have a means configured to detect the driving state of the focusing group.

The means configured to detect the driving state of the focusing group can be achieved by using a rotary encoder, a phototransistor, or the like, but a specific means is not restricted.

4. Optical System

4-1. Optical Configuration of Optical System

First, an embodiment of an optical system of an imaging apparatus according to the present invention will be described. The optical system of the present embodiment may include some lenses or some lens groups included in the optical system as a focusing group for changing an imaging position, may include the entire optical system as a focusing group for changing an imaging position, or may include an image plane by driving the image plane as a focusing group. The optical system is only required to be capable of forming an image on an image plane, and a specific configuration of the optical system is not restricted. In addition, changing the imaging position means changing the distance between the imaging position in the optical system and the imaging face. That is, even when the image plane is used as a focusing group, it corresponds to the change of the imaging position. Further, the present invention can be implemented by a zoom lens having a variable focal length or a single focus having a fixed focal length.

4-2. Configuration of Focusing Group

In the present invention, the focusing group is a means configured to change an imaging position of the optical system. In a case where some lenses or some lens groups included in the optical system is the focusing group, the imaging position can be changed by moving the lens group movable at the time of focusing in the optical axis direction. Alternatively, in a case where the focusing group is the entire optical system, the imaging position can be changed by moving the entire optical system in the optical axis direction with respect to the image plane. Alternatively, in a case where the focusing group is the image plane, the imaging position can be changed by moving the image plane in the optical axis direction with respect to the optical system. In addition, the focusing group may be a liquid lens, and the imaging position may be changed by applying power to the liquid lens to change the interface shape of the liquid lens. Although there is a plurality of means configured to change the imaging position in this manner, in the present invention, the focusing group may be any of these means, and a specific configuration of the focusing group is not restricted as long as the imaging position can be changed.

In a case where the focusing group according to the present invention includes some lenses or some lens groups included in the optical system, it is sufficient to drive only some lenses or some lens groups at the time of focusing, so that the focusing group is light as compared with a case where the entire optical system is used as the focusing group. Therefore, it is easy to reduce the size and weight of the entire optical system including the lens barrel configuration.

In this case, there is no limitation on the number of lenses of the lens group movable at the time of focusing, but the lens group is preferably configured by one single lens unit. Here, the single lens unit refers to one single lens or a lens unit such as a cemented lens in which a plurality of single lenses is integrated without an air interval. That is, the single lens unit has the most object side face and the most image side face in contact with air and the other faces not in contact with air even in a case where it has a plurality of optical faces. In this specification, the single lens may be either a spherical lens or an aspherical lens. In addition, the aspherical lens includes a so-called composite aspherical lens in which an aspherical layer is attached to the surface. By adopting such a configuration, various manufacturing errors such as an eccentricity error and an error in the interval between the single lenses can be reduced. Therefore, it is possible to reduce a decrease in optical performance due to a manufacturing error, and it is possible to reduce a variation in performance for each product. As a is easy to realize high performance. More preferably, the focusing group includes a single lens, that is, one single lens or one aspherical lens, so that it is possible to further reduce deterioration in optical performance due to a manufacturing error, and it is easy to realize high performance.

In a case where the focusing group according to the present invention is the entire optical system, the imaging position can be changed by integrally moving the entire lens included in the optical system in the optical axis direction with respect to the image plane. When the entire optical system is used as a focusing group and the entire lens is integrally focused, the frame configuration for holding the lens is simplified and the mechanical configuration is simplified, so that it is easy to reduce the cost of the entire optical system including the lens barrel configuration.

In a case where the focusing group according to the present invention is the image plane, the imaging position can be changed by moving the focusing group, that is, the image plane in the optical axis direction. At this time, since the position of the entire optical system is fixed in the optical axis direction at the time of focusing, the frame configuration for holding the lens is simplified, the mechanical configuration is simplified, and the overall cost including the lens barrel configuration of the optical system can be easily reduced.

In a case where the focusing group according to the present invention is the liquid lens, the imaging position can be changed by deforming the shape of the focusing group, that is, the interface of the liquid lens. At this time, since the position of the entire optical system is fixed the optical axis direction at the time of focusing, the frame configuration for holding the lens is simplified, the mechanical configuration is simplified, and the overall cost including the lens barrel configuration of the optical system can be easily reduced.

Since the focusing group according to the present invention is a means configured to change the imaging position, the number of focusing groups provided in the imaging apparatus is not limited. When there is only one focusing group, a mechanism for driving the focusing group is simplified, and it is effective for downsizing and cost reduction. In addition, the aberration variation can be reduced by having two or more focusing groups and driving each of them, and the necessary information can be obtained with high resolution. Note that the plurality of focusing groups may include a plurality of focusing groups of the same type, or may include one or more focusing groups of different types. Driving the focusing group means that power is applied to the focusing group to move the position of the focusing group, or when the focusing group is a liquid lens, power is applied to change the interface shape.

As described above, in a case where the focusing group is the optical system or the image plane, the driving means may be a motor or the like for driving (moving in the optical axis direction) the optical system or the image plane, and in a case where the focusing group is the liquid lens, the driving means may be an electrode or the like serving as a voltage source for changing the shape of the interface of the liquid lens. The driving amount of the motor and the voltage amount to the electrode can be controlled by a control device such as a CPU. Note that a specific process of driving the focusing group will be described later.

4-3. Conditional Expression

In the present invention, the optical system preferably satisfies one or more conditional expressions described below.

4-3-1. Conditional Expression (1)

The optical system preferably satisfies the following conditional expression.

$$0.20 < |(1-\beta f^2) \times \beta r^2| < 12.00 \quad (1)$$

where $\beta f$ is a lateral magnification of a focusing group, and $\beta r$ is a lateral magnification of a lens group closer to the image than the focusing group.

The above conditional expression (1) is an expression for defining the absolute value of the focus sensitivity of the focusing group according to the present invention, that is, the image plane movement amount when the focusing group is driven by a unit amount. When the conditional expression (1) is satisfied, the driving amount is optimized, and the space for driving can be downsized. In addition, since highly accurate control for driving is unnecessary, control is easy. However, in a case where the image plane is the focusing group according to the present invention, the lateral magnification $\beta f$ of the focusing group is set to 0, and the lateral magnification of the lens group closer to the image than the focusing group is set to 1.

On the other hand, when the numerical value of the conditional expression (1) is equal to or more than the upper limit, that is, when the focus sensitivity of the focusing group is too large, the driving amount of focusing for correcting the deviation of the imaging position is too small, and highly accurate control is required, which is not preferable. When the numerical value of the conditional expression (1) is less than or equal to the lower limit, that is, when the focus sensitivity of the focusing group is too small, the driving amount at the time of focusing for correcting the deviation of the imaging position is large, and it is difficult to reduce the overall optical length, which is not preferable.

In order to obtain the above effect, the upper limit value of the above conditional expression (1) is preferably 11.00, more preferably 10.00, still more preferably 9.00, still more preferably 8.00, and still more preferably 7.00. The lower limit value of the conditional expression (1) is preferably 0.25, more preferably 0.30, still more preferably 0.35, still more preferably 0.40, and still more preferably 0.45.

4-3-2. Conditional Expression (2)

The optical system preferably includes at least one lens having negative refractive power, and satisfies the following conditional expression.

$$1.54 < Ndn < 2.30 \tag{2}$$

where

Ndn is a refractive index of the lens having the negative refractive power with respect to d Line.

The conditional expression (2) defines the refractive index of the lens having negative refractive power included in the optical system with respect to d Line (wavelength λ=587.56 nm). Since the optical system of the imaging apparatus has positive refractive power as a whole, the negative refractive power is relatively weak. Therefore, the Petzval sum can be corrected by using a glass material having a high refractive index for a lens having a negative refractive index. As a result, the image planarity is corrected. Therefore, when the lens having negative refractive power included in the optical system satisfies the conditional expression (2), the image planarity is corrected, and the necessary information can be obtained with high resolution.

On the other hand, when the numerical value of the conditional expression (2) is equal to or more than the upper limit, that is, when the refractive index of the lens having negative refractive power with respect to d Line increases, the correction of the Petzval sum is advantageous, but the lens having negative refractive power is expensive, which is not preferable in terms of cost reduction. When the numerical value of the conditional expression (2) is less than or equal to the lower limit, in a case where the refractive index of the lens having negative refractive power with respect to d Line decreases, the correction of the Petzval sum is insufficient, and thus the image planarity is insufficient. Therefore, it is not preferable in terms of high performance.

In order to obtain the above effect, the upper limit value of the conditional expression (2) is preferably 2.20 and more preferably 2.15. The lower limit value of the conditional expression is preferably 1.55, more preferably 1.56, still more preferably 1.58, still more preferably 1.60, and still more preferably 1.62.

When there is a plurality of lenses having negative refractive power in the optical system, it is preferable that at least one of the lenses having negative refractive power satisfies the conditional expression (2). In order to obtain the above effect, it is more preferable that a lens having the highest refractive index among lenses having negative refractive power included in the optical system satisfies the above conditional expression (2).

4-3-3. Conditional Expression (3)

The optical system preferably includes at least one lens having positive refractive power, and satisfies the following conditional expression.

$$45.0 < vdp < 98.0 \tag{3}$$

where vdp is an Abbe number of the lens having the positive refractive power with respect to d Line.

The conditional expression (3) defines an Abbe number of the lens having positive refractive power included in the optical system with respect to d Line (wavelength λ=587.56 nm). By using a glass material having a relatively large Abbe number for at least one lens having positive refractive power included in the optical system, dispersion of chromatic aberration can be reduced. Therefore, when the conditional expression (3) is satisfied, the chromatic aberration is corrected, and the necessary information can be obtained with high resolution.

On the other hand, when the numerical value of the above conditional expression (3) is the upper limit or more, that is, when an Abbe number of the lens having positive refractive power with respect to d Line increases, the correction of the chromatic aberration is advantageous, but the lens having positive refractive power is expensive, which is not preferable in term of cost reduction. When the numerical value of the conditional expression (3) is less than or equal to the lower limit, in a case where an Abbe number of the lens having positive refractive power with respect to d Line decreases, the chromatic aberration is insufficiently corrected. Therefore, it is not preferable in terms of high performance.

In order to obtain the above effect, the upper limit value of the above conditional expression (3) is preferably 95.5, more preferably 91.0, still more preferably 82.0, still more preferably 77.0, and still more preferably 75.0. The lower limit value of the conditional expression (3) is preferably 45.0, more preferably 47.0, still more preferably 49.0, still more preferably 51.0, and still more preferably 53.0.

When there is a plurality of lenses having positive refractive power in the optical system, it is preferable that at least one of the lenses having positive refractive power satisfies the conditional expression (3). In order to obtain the above effect, it is more preferable that a lens having the largest Abbe number among the lenses having positive refractive power included in the optical system satisfies the conditional expression (3).

4-3-4. Conditional Expression (4)

The optical system preferably satisfies the following conditional expression.

$$|\beta f| < 6.00 \tag{4}$$

where

βf is a lateral magnification of the focusing group.

The conditional expression (4) defines the lateral magnification of the focusing group. When the conditional expression (4) is satisfied, the amount of aberration generated in the focusing group can be reduced. In addition, when the lateral magnification of the lens group closer to the image than the focusing group is βr and the lateral magnification of the focusing group is βf, the image plane movement amount when the focusing group is driven by a unit amount can be expressed as $(1-\beta f^2) \times \beta r^2$. Therefore, the driving amount of the focusing group can be reduced by relatively reducing βf. As a result, miniaturization and high performance are achieved.

On the other hand, when the numerical value of the conditional expression (4) is the upper limit or more, the lateral magnification of the focusing group is too large, and the generation amount of aberration of the focusing group is large, which is not preferable from the viewpoint of performance improvement.

In order to obtain the above effect, the upper limit value of the above conditional expression (4) preferably 5.50, more preferably 5.00, still more preferably 4.60, still more preferably 4.30, and still more preferably 4.00.

4-3-5. Conditional Expression (5)

The optical system preferably satisfies the following conditional expression.

$$-10.00 < fL1/f < -0.10 \quad (5)$$

where fL1 is a focal length of the lens, of the optical system, closest to the object, and f is a focal length of the optical system The conditional expression (5) defines a ratio between the focal length of the lens, of the optical system, closest to the object and the focal length of the optical system. Since the conditional expression (5) has a negative value, the lens, of the optical system, closest to the object has negative refractive power. Since the lens closest to the object has negative refractive power, the entrance pupil position is easily disposed close to the object, and the front lens diameter, of the optical system, having a wide angle of view can be reduced. Accordingly, when the conditional expression (5) is satisfied, downsizing and cost reduction can be achieved.

On the other hand, when the numerical value of the conditional expression (5) is equal to or more than the upper limit, the focal length of the lens, of the optical system, closest to the object is too short, and field curvature and coma aberration are greatly generated, which is not preferable in terms of high performance. When the numerical value of the conditional expression (5) is less than or equal to the lower limit, the focal length of the lens, of the optical system, closest to the object is too long, and the entrance pupil position is far from the object. This leads to an increase in the front lens diameter, which is not preferable in terms of downsizing and cost reduction.

In order to obtain the above effect, the upper limit value of the above conditional expression (5) is preferably −0.25, more preferably −0.40, still more preferably −0.55, still more preferably −0.70, and still more preferably −0.85. The lower limit value of the conditional expression (5) is preferably −8.00, more preferably −6.00, still more preferably −4.50, still more preferably −3.50, and still more preferably −2.50.

4-3-6. Conditional Expression (6)

Preferably, the imaging apparatus includes an image sensor configured to receive an optical image formed by the optical system and convert the optical image into an electrical image signal, and satisfies the following condition.

$$500 < f \times \tan \omega / P \quad (6)$$

where f is a focal length of the optical system,

ω is a half angle of view of the optical system, and

P is a pixel center interval of adjacent pixels of the image sensor.

The conditional expression (6) defines the ratio between the size of the image plane of the optical system and the pixel pitch. That is, the expression defines the number of pixels or the image sensor. In order to obtain information with high resolution, not only the optical system is required to have high imaging performance, but also the number of pixels of an image sensor that captures an image as electronic data is required to be large. In a case where the conditional expression (6) is satisfied, the number of pixels of the image sensor is appropriate, and a necessary amount of information can be secured.

On the other hand, when the numerical value of the conditional expression (6) is less than or equal to the lower limit, the number of pixels of the image sensor decreases. Therefore, it is not preferable in that it is difficult to secure the necessary information amount.

In order to obtain the above effect, the lower limit value of the above conditional expression (6) is preferably 1000, more preferably 1500, still more preferably 2000, still more preferably 2500, and still more preferably 3000.

Since the above conditional expression (6) is an expression that defines the number of pixels of the image sensor, it is not necessary to define an upper limit. However, when the number of pixels of the image sensor is too large, the load of image processing and power consumption for processing information increases, and thus the upper limit may be set in the conditional expression (6). When the upper limit value is set, it is preferably 50,000, more preferably 40,000, still more preferably 30,000, still more preferably 25000, and still more preferably 20,000.

Here, the image sensor and the like are not particularly limited, and a solid state image sensor such as a charge coupled device (CCD) sensor or a complementary metal oxide semiconductor (CMOS) sensor can also be used.

Next, an optical system of the present invention will be specifically described with reference to Examples. However, the present invention is not limited to the following examples. In each lens cross-sectional view, the left side is the object side and the right side is the image side when viewed in the drawing.

EXAMPLE 1

(1) Lens Configuration of Optical System

Figure 2:
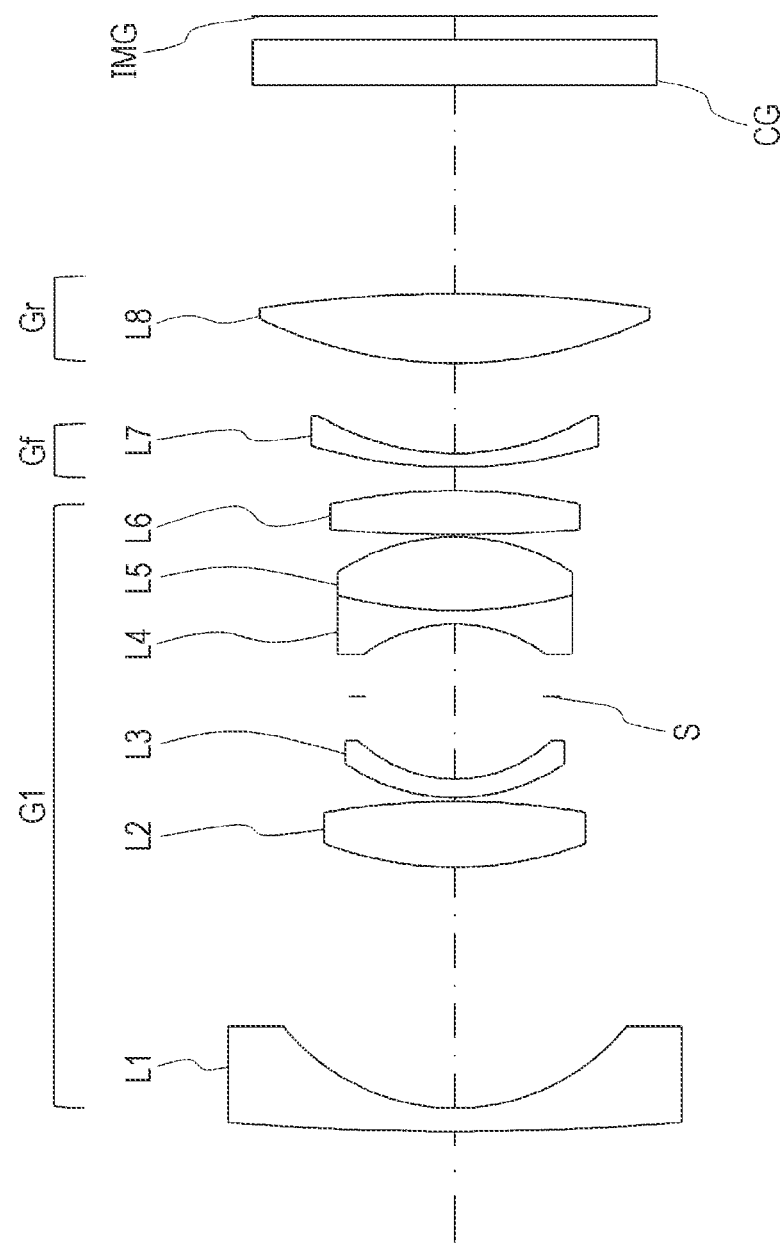
FIG. 2 is a cross-sectional view illustrating a lens configuration example of an optical system of Example 1 of the present invention.

FIG. 2 is a lens cross-sectional view illustrating a configuration of an optical system of Example 1 according to the present invention. The optical system includes an object side lens group G1, a focusing group Gf, and an image side lens group Gr in order from the object side. The object side lens group G1 includes, in order from the object side, a meniscus first lens L1 having negative refractive power and an object side face that is convex toward the object, a biconvex second lens L2 having positive refractive power, a meniscus third lens L3 having negative refractive power and an object side face that is convex toward the object, an aperture stop S, a cemented lens in which a biconcave fourth lens L4 and a biconvex fifth lens L5 are cemented, and a biconvex sixth lens L6 having positive refractive power. The focusing group Gf includes a meniscus seventh lens L7 having negative refractive power and having an object side face that is convex toward the object. The image side lens group Gr includes a biconvex eighth lens L8 having positive refractive power.

Here, to change the imaging position of the optical system, the seventh lens L7 constituting the focusing group Gf is moved in the optical axis direction. The seventh lens L7 is a lens having the highest refractive index among lenses having negative refractive power. The fifth lens L5 is a lens having the largest Abbe number among lenses having positive refractive power. The first lens L1, which is the lens closest to the object, has a negative refractive power.

Note that "IMG" in the drawing represents an image plane. It is an imaging face of a solid state image sensor such as a CCD sensor or a CMOS sensor described above. The light incident from the object side of the optical system forms an image on an image plane. The solid state image sensor converts the received optical image into an electrical image signal. An image processing unit (image processing processor or the like) included in an imaging apparatus or the like generates a digital image corresponding to an image of a subject based on an electrical image signal output from an image sensor. The digital image can be recorded on a recording medium such as a hard disk device (HDD), a memory card, an optical disk, or a magnetic tape. The image plane may be a film surface of a silver salt film.

In addition, "CG" in the drawing is an optical block indicating an image plane. The optical block CG corresponds to an optical filter, a faceplate, a crystal low-pass filter, an infrared cut filter, or the like. These reference numerals (IMG, CG) denote the same elements in the drawings illustrated in the other Examples, and thus the description thereof will be omitted below.

(2) Numerical Examples

Numerical examples to which specific numerical values of the optical system used in Example 1 are applied will be described. Table 1 shows lens data of the imaging lens. In Table 1, "surface number" represents a number of the lens surface counted from the object side, "r" represents a curvature radius (mm) (where, a face in which the value of r is INF indicates that the surface is a flat face.) of the lens surface, "d" represents an interval (mm) in lens surface between the i-th (i is a natural number) lens surface and the (i−1)-th lens surface from the object side on the optical axis, "Nd" represents a refractive index with respect to d Line (wavelength λ=587.56 nm), "vd" represents an Abbe number with respect to d Line, and "h" represents an effective radius (mm). In a case where the lens surface is an aspherical face, "ASP" is added next to the surface number in the table. In addition, in the case of an aspherical face, the paraxial curvature radius is indicated in the column of "r".

Table 2 shows various pieces of data of the optical system. Specifically, a focal length (mm), an F value, a half angle of view (°), an image height (mm), an entire lens length (mm), and a back focus (BF (in air)) (mm) of the imaging lens are illustrated. Here, the entire lens length is the distance from the object side face of the first lens to the image plane on the optical axis. In addition, the back focus is a value obtained by air-converting the distance from the image side face of the nth lens disposed closest to the image to the image plane on the optical axis.

Table 3 shows variable interval data of the optical system. D0 is the distance from the subject to the surface closest to the object.

Table 4 shows the focal lengths of respective lenses constituting the optical system.

Table 5 shows the focal length of each lens group constituting the optical system.

In addition, Table 21 shows the numerical values of the respective conditional expressions of the optical system. Since the matters related to each of these tables are the same in each of the tables shown in other Examples, the description thereof will be omitted below.

Figure 3:
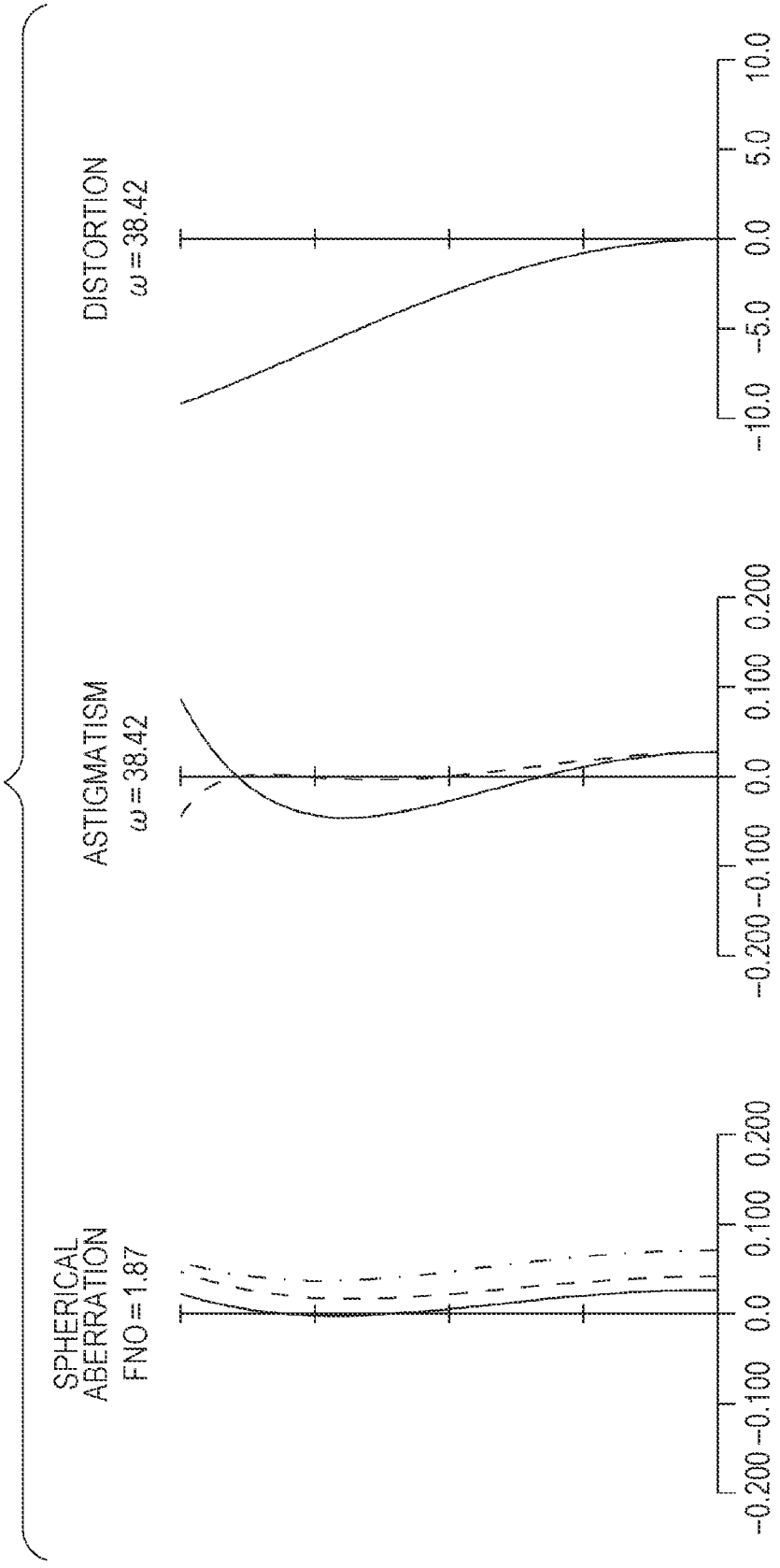
FIG. 3 is a spherical aberration diagram, an astigmatism diagram, and a distortion diagram at the time of imaging a subject at infinity according to Example 1 of the present invention.

FIG. 3 illustrates a longitudinal aberration diagram of the optical system during infinity focus. The longitudinal aberration diagram illustrated in FIG. 3 includes spherical aberration (mm), astigmatism (mm), and distortion (%) in order from the left side facing the figure. In the figure representing the spherical aberration, the vertical axis represents the open F number (FNO). The solid line indicates spherical aberration with respect to d Line (wavelength: 587.56 nm), the dotted line indicates spherical aberration with respect to C Lin (wavelength: 656.27 nm), and the dash-dot line indicates spherical aberration at with respect to g Line (wavelength: 435.84 nm). In the figure representing the astigmatism, the vertical axis represents the image height (mm). A solid line indicates a sagittal direction with respect to d Line (wavelength: 587.56 nm), and a dotted line indicates a meridional direction with respect to d Line. In the figure illustrating the distortion, the vertical axis represents the image height (mm), and the distortion (%) with respect to d Line (wavelength 587.56 nm) is illustrated. Since the matters related to these longitudinal aberration diagrams are the same in the longitudinal aberration diagrams illustrated in other Examples, the description thereof will be omitted below.

TABLE 1

| Surface number | r | d | Nd | vd | h |
|---|---|---|---|---|---|
| 1 | 133.3156 | 1.000 | 1.51680 | 64.20 | 8.967 |
| 2 | 9.6236 | 10.483 | | | 7.110 |
| 3 | 16.2366 | 2.870 | 1.74330 | 49.22 | 5.170 |
| 4 | −33.0454 | 0.165 | | | 4.700 |
| 5 | 8.4613 | 0.800 | 1.48749 | 70.44 | 4.328 |
| 6 | 6.0832 | 3.580 | | | 3.991 |
| 7 S | INF | 3.150 | | | 3.850 |
| 8 | −6.6339 | 0.600 | 1.67270 | 32.17 | 3.759 |
| 9 | 19.9164 | 3.197 | 1.69680 | 55.46 | 4.290 |
| 10 | −9.2868 | 0.100 | | | 4.634 |
| 11 | 66.5750 | 1.910 | 1.83481 | 42.72 | 4.660 |
| 12 | −24.9888 | D14 | | | 4.912 |
| 13 | 21.5424 | 0.593 | 1.85451 | 25.15 | 5.672 |
| 14 | 11.5208 | D16 | | | 5.632 |
| 15 | 19.5637 | 3.030 | 1.72916 | 54.67 | 7.626 |
| 16 | −58.0110 | 9.054 | | | 7.696 |
| 17 | INF | 2.000 | 1.51680 | 64.20 | 7.945 |
| 18 | INF | 1.000 | | | 7.979 |

TABLE 2

| Focal length | 11.112 |
|---|---|
| F value | 1.867 |
| Half angle of view | 38.481 |
| Image height | 8.000 |
| Entire lens length | 48.488 |
| BF (in air) | 11.373 |

TABLE 3

| Variable interval data | | | |
|---|---|---|---|
| D0 | INF | 417.286 | 101.115 |
| D12 | 1.028 | 1.516 | 2.969 |
| D14 | 3.928 | 3.440 | 1.987 |

TABLE 4

| Lens | Surface number | Focal length |
|---|---|---|
| L1 | 1-2 | −20.126 |
| L2 | 3-4 | 15.020 |
| L3 | 5-6 | −49.900 |
| L4 L5 | 8-10 | −121.512 |
| L6 | 11-12 | 21.973 |
| L7 | 13-14 | −29.794 |
| L8 | 15-16 | 20.400 |

TABLE 5

| Group | Surface number | Focal length |
|---|---|---|
| G1 | 1-12 | 13.017 |
| Gf | 13-14 | −29.794 |
| Gr | 15-16 | 20.400 |

EXAMPLE 2

(1) Lens Configuration of Optical System

Figure 4:
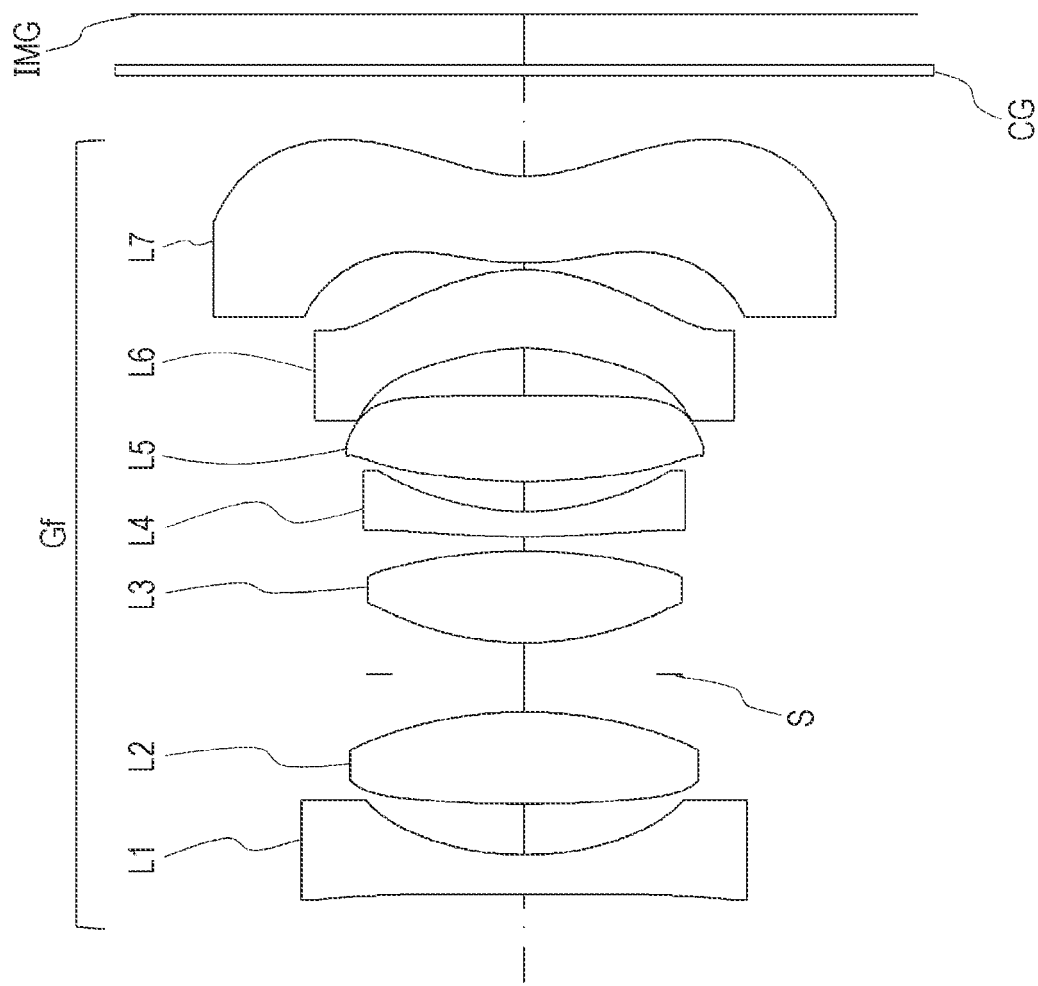
FIG. 4 is a cross-sectional view illustrating a lens configuration example of an optical system of Example 2 of the present invention.

FIG. 4 is a lens cross-sectional view illustrating a configuration of an optical system of Example 2 according to the present invention. In Example 2, the entire optical system is configured as a focusing group Gf according to the present invention. The focusing group Gf includes, in order from the object side, a first lens L1 having negative refractive power, a biconvex second lens L2 having positive refractive power, an aperture stop S, a biconvex third lens L3 having positive refractive power, a meniscus fourth lens L4 having negative refractive power and having an object side face that is convex toward the object, a biconvex fifth lens L5 having positive refractive power, a meniscus sixth lens L6 having positive refractive power and having an object side face that is concave toward the object, and a meniscus seventh lens L7 having negative refractive power and having an image side face that is concave toward the image. All the lens glass materials constituting the optical system of Example 2 are resin.

Here, the imaging position of the optical system is changed by integrally moving the first lens L1 to the seventh lens L7 constituting the focusing group Gf, that is, by moving the entire optical system in the optical axis direction. Here, changing the imaging position of the optical system by moving the entire optical system is equivalent to changing the imaging position by moving the image plane. That is, it is equivalent that the image plane serves as a focusing group. In a case where the image plane is set as the focusing group in this manner, the lateral magnification βf of the focusing group can be set to 0, and the literal magnification of the lens group closer to the image than the focusing group can be set to 1. The fourth lens L4 is a lens having the highest refractive index among lenses having negative refractive power. The second lens L2 is a lens having the largest Abbe number among lenses having positive refractive power. The first lens L1, which is the lens closest to the object, has a negative refractive power.

(2) Numerical Examples

Figure 5:
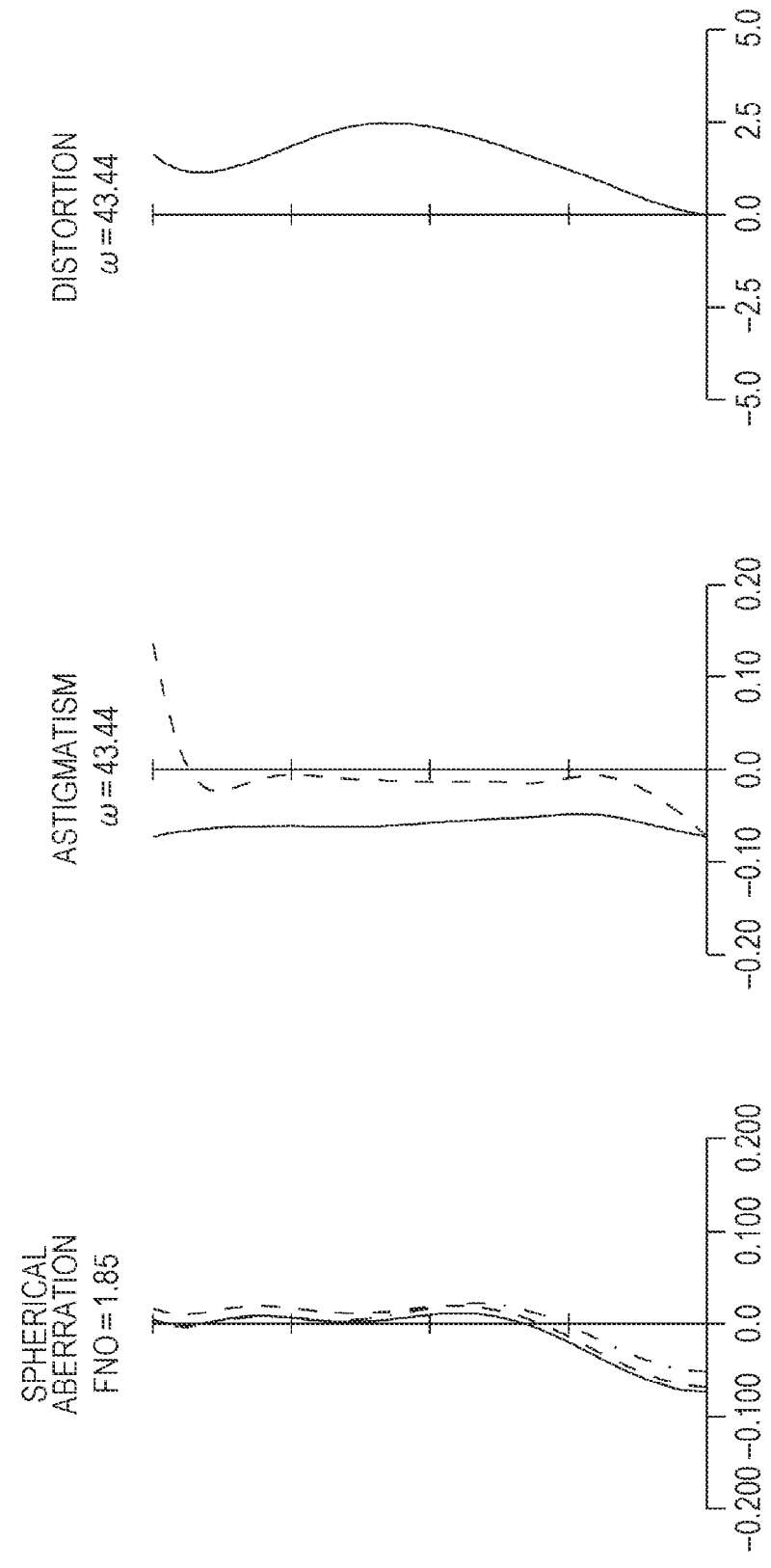
FIG. 5 is a spherical aberration diagram, an astigmatism diagram, and a distortion diagram at the time of imaging a subject at infinity according to Example 2 of the present invention.

Next, numerical examples to which specific numerical values of the optical system used in Example 2 are applied will be described. Table 6 shows lens data of the optical system, Table 7 shows various pieces of data of the optical system, Table 9 shows variable interval data, Table 10 shows focal lengths of respective lenses, and Table 11 shows focal lengths of respective lens groups. FIG. 5 illustrates a longitudinal aberration diagram of the optical system during infinity focus.

The aspherical data is shown in Table 8-1, Table 8-2, and Table 8-3. As the aspherical data, the aspherical coefficients in a case where the shape of the aspherical face shown in Table 6 is defined by the following expression are shown. Note that the aspherical coefficient can be expressed by the following aspheric expression with the amount of displacement in the optical axis direction at the position of the height h from the optical axis as a face vertex reference.

$$z = ch^2/[1+\{1-(1+k)c^2h^2\}^{1/2}] + A4h^4 + A6h^6 + A8h^8 + \cdots$$

where c is a curvature (1/r), h is a height from the optical axis, k is a conic coefficient (conic constant), and A4, 6, A8, . . . are aspherical coefficients of respective orders. In addition, the notation "E±m" represents an integer.) in the numerical values of the aspherical coefficient and the conic constant means "×10±m".

TABLE 6

| Surface number | r | d | Nd | vd | h |
|---|---|---|---|---|---|
| 1 ASP | −450.4880 | 0.780 | 1.54472 | 55.86 | 3.997 |
| 2 ASP | 6.1328 | 1.007 | | | 3.140 |
| 3 ASP | 22.5431 | 1.818 | 1.54472 | 55.86 | 3.120 |
| 4 ASP | −8.8315 | 0.747 | | | 2.900 |
| 5 S | 0.0000 | 0.623 | | | 2.610 |
| 6 ASP | 6.3072 | 1.811 | 1.54472 | 55.86 | 2.660 |
| 7 ASP | −10.5776 | 0.282 | | | 2.820 |
| 8 ASP | 16.3457 | 0.500 | 1.65670 | 21.21 | 2.860 |
| 9 ASP | 4.8234 | 0.591 | | | 2.885 |
| 10 ASP | 10.6387 | 1.684 | 1.54472 | 55.86 | 3.008 |
| 11 ASP | −132.2736 | 0.949 | | | 3.204 |
| 12 ASP | −3.7291 | 1.550 | 1.54472 | 55.86 | 3.179 |
| 13 ASP | −3.4675 | 0.128 | | | 3.764 |
| 14 ASP | 4.9960 | 1.717 | 1.54472 | 55.86 | 4.140 |
| 15 ASP | 3.0654 | D15 | | | 5.850 |
| 16 | 0.0000 | 0.210 | 1.51680 | 64.20 | 7.278 |
| 17 | 0.0000 | 1.000 | | | 7.351 |

TABLE 7

| | |
|---|---|
| Focal length | 8.187 |
| F value | 1.853 |
| Half angle of view | 43.437 |
| Image height | 7.930 |
| Entire lens length | 17.397 |
| BF (in air) | 3.140 |

TABLE 8-1

| Surface number | 1 | 2 | 3 | 4 | 6 |
|---|---|---|---|---|---|
| k | 0.000 | 0.000 | 0.000 | 0.000 | 0.000 |
| A4 | 8.7269E−04 | 2.4715E−03 | −5.4069E−05 | −3.7765E−05 | −1.1615E−04 |

TABLE 8-1-continued

| Surface number | 1 | 2 | 3 | 4 | 6 |
|---|---|---|---|---|---|
| A6 | −3.1091E−04 | −3.7810E−04 | −2.7130E−05 | −1.4151E−04 | 1.1373E−04 |
| A8 | 3.2797E−05 | 1.6752E−05 | −3.4075E−05 | 2.1995E−05 | −2.9271E−05 |
| A10 | −1.5621E−06 | 2.9336E−06 | 8.0917E−06 | −1.1665E−06 | 1.8445E−06 |
| A12 | 2.7613E−08 | −1.2545E−07 | −5.0624E−07 | 7.4978E−09 | 2.7794E−07 |
| A14 | 0.0000E+00 | 3.8122E−09 | 1.3229E−08 | 0.0000E+00 | −3.0715E−08 |

TABLE 8-2

| Surface number | 7 | 8 | 9 | 10 | 11 |
|---|---|---|---|---|---|
| K | 0.000 | 0.000 | 0.000 | 0.000 | 0.000 |
| A4 | 1.2745E−03 | −4.3778E−03 | −8.7285E−03 | −3.8704E−03 | 1.7870E−03 |
| A6 | −4.9370E−04 | 1.6399E−03 | 2.6813E−03 | 6.0584E−04 | −6.5791E−04 |
| A8 | 6.0726E−05 | −5.1943E−04 | −6.2209E−04 | −6.2808E−05 | 8.7347E−05 |
| A10 | −4.3818E−06 | 8.5529E−05 | 8.8723E−05 | 7.7015E−06 | −1.5871E−05 |
| A12 | 6.0120E−07 | −6.6778E−06 | −6.5334E−06 | −3.9592E−07 | 1.5138E−06 |
| A14 | −4.6359E−08 | 1.9229E−07 | 1.8687E−07 | 0.0000E+00 | −6.3493E−08 |

TABLE 8-3

| Surface number | 12 | 13 | 14 | 15 |
|---|---|---|---|---|
| K | 0.000 | −1.704 | −0.346 | −4.200 |
| A4 | 2.0346E−02 | 7.0833E−03 | −1.3517E−02 | −5.7461E−03 |
| A6 | −3.3446E−03 | −1.5146E−03 | 1.7980E−04 | 3.1996E−04 |
| A8 | 4.9601E−04 | 2.6107E−04 | 5.8209E−05 | −1.3442E−05 |
| A10 | −5.7561E−05 | −2.8204E−05 | −7.2981E−06 | 3.1401E−07 |
| A12 | 3.5539E−06 | 1.6215E−06 | 3.6251E−07 | −3.5242E−09 |
| A14 | −9.0390E−08 | −3.5765E−08 | −6.9730E−09 | 8.0038E−12 |

TABLE 9

Variable interval data

| D0 | INF | 1226.137 | 417.699 |
|---|---|---|---|
| D15 | 2.001 | 2.057 | 2.165 |

TABLE 10

| Lens | Surface number | Focal length |
|---|---|---|
| L1 | 1-2 | −11.101 |
| L2 | 3-4 | 11.892 |
| L3 | 6-7 | 7.539 |
| L4 | 8-9 | −10.602 |
| L5 | 10-11 | 18.152 |
| L6 | 12-13 | 29.375 |
| L7 | 14-15 | −21.218 |

TABLE 11

| Group | Surface number | Focal length |
|---|---|---|
| Gf | 1-15 | 8.187 |

EXAMPLE 3

(1) Lens Configuration of Optical System

Figure 6:
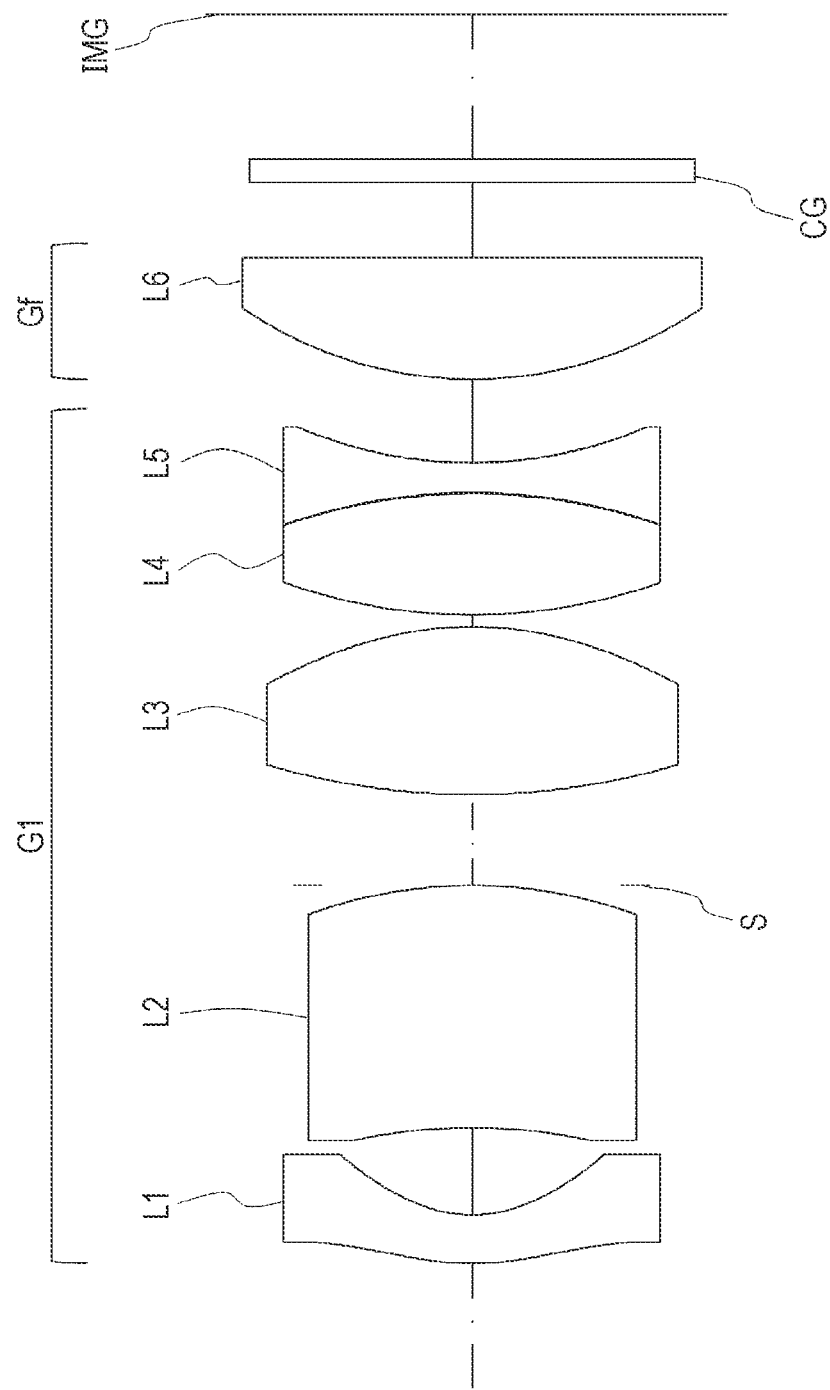
FIG. 6 is a cross-sectional view illustrating a lens configuration example of an optical system of Example 3 of the present invention.

FIG. 6 is a lens cross-sectional view illustrating a configuration of an optical system of Example 3 according to the present invention. The optical system includes an object side lens group Gf and a focusing group Gf in order from the object side. The object side lens group G1 includes, in order from the object side, a meniscus first lens L1 having negative refractive power and an object side face that is convex toward the object, a meniscus second lens L2 having positive refractive power and an object side face that is concave toward the object, an aperture stop S, a biconvex third lens L3 having positive refractive power, and a cemented lens in which a biconvex fourth lens L4 having positive refractive power and a biconcave fifth lens L5 having negative refractive power are cemented. The focusing group Gf includes a biconvex sixth lens L6 having positive refractive power.

Here, the imaging position of the optical system is changed by moving the sixth lens L6 constituting the focusing group Gf in the optical axis direction. The fifth lens L5 is a lens having the highest refractive index among lenses having negative refractive power. The third lens L3 is a lens having the largest Abbe number among lenses having positive refractive power. The first lens L1, which is the lens closest to the object, has a negative refractive power.

(2) Numerical Examples

Figure 7:
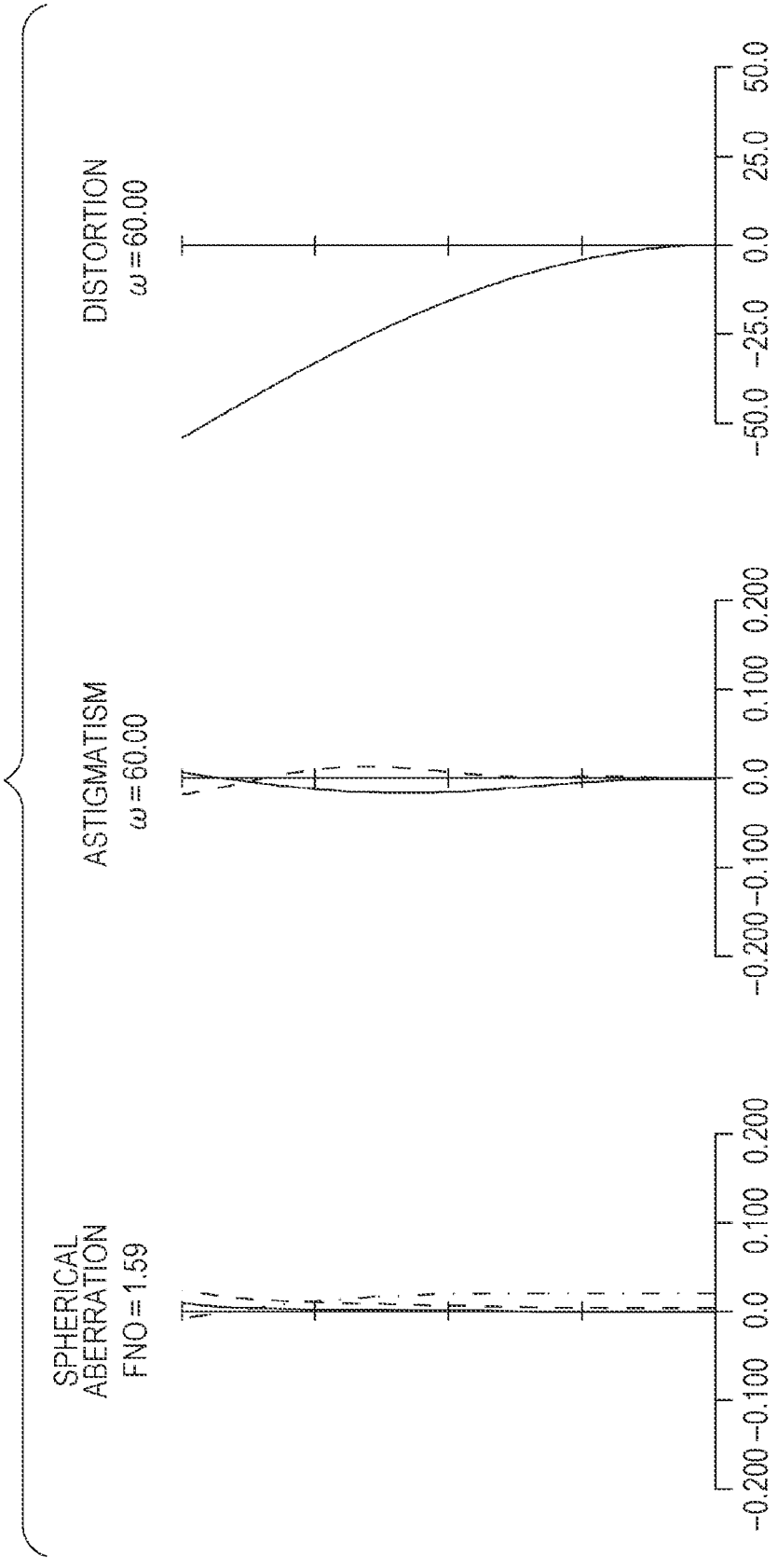
FIG. 7 is a spherical aberration diagram, an astigmatism diagram, and a distortion diagram at the time of imaging a subject at infinity according to Example 3 of the present invention.

Next, numerical examples to which specific numerical values of the optical system used in Example 3 are applied will be described. Tables 12 to 17 show lens data of the optical system, various pieces of data of the optical system, aspherical coefficient data of the optical system, variable interval data, focal lengths of respective lenses, and focal lengths of respective lens groups. FIG. 7 illustrates a longitudinal aberration diagram of the optical system during infinity focus.

TABLE 12

| Surface number | r | d | Nd | vd | h |
|---|---|---|---|---|---|
| 1 ASP | 5.7395 | 1.000 | 1.84819 | 39.96 | 3.549 |
| 2 ASP | 2.6436 | 1.817 | | | 2.609 |
| 3 | −11.5121 | 5.031 | 1.77829 | 23.91 | 2.470 |
| 4 | −9.9198 | 0.000 | | | 3.093 |
| 5 S | INF | 1.893 | | | 3.088 |
| 6 ASP | 14.4595 | 3.480 | 1.61880 | 63.85 | 3.713 |
| 7 ASP | −7.4589 | 0.250 | | | 3.881 |
| 3 | 11.7828 | 2.522 | 1.61800 | 63.40 | 3.560 |
| 9 | −11.9307 | 0.010 | 1.56732 | 42.84 | 3.480 |
| 10 | −11.9307 | 0.626 | 1.85450 | 25.15 | 3.479 |
| 11 | 9.1892 | D11 | | | 3.464 |
| 12 | 8.4295 | 2.542 | 1.61800 | 63.40 | 4.331 |
| 13 | −1061.5265 | D13 | | | 4.289 |
| 14 | INF | 0.500 | 1.51680 | 64.20 | 4.207 |
| 15 | INF | 2.000 | | | 4.189 |

TABLE 13

| | |
|---|---|
| Focal length | 5.077 |
| F value | 1.587 |
| Half angle of view | 60.000 |
| Image height | 4.022 |
| Entire lens length | 25.943 |
| BF (in air) | 4.866 |

TABLE 14

| Surface number | 1 | 2 | 6 | 7 |
|---|---|---|---|---|
| k | −2.29952 | −1.69223 | 0.00000 | 0.00068 |
| A4 | −5.32894E−03 | −1.23061E−03 | −1.42697E−04 | 3.27942E−04 |
| A6 | 1.92822E−04 | 2.50316E−04 | −2.52694E−08 | 2.32251E−06 |
| A6 | −2.51105E−06 | −6.12977E−06 | 2.15506E−07 | 2.18147E−07 |
| A10 | −3.67698E−08 | 7.70490E−07 | 1.35070E−10 | 1.59564E−09 |
| A12 | 0.00000E+00 | 0.00000E+00 | 0.00000E+00 | 0.00000E+00 |

TABLE 15

Variable interval data

| D0 | INF | 5000.000 | 2000.000 |
|---|---|---|---|
| D11 | 1.737 | 1.730 | 1.719 |
| D13 | 1.536 | 1.543 | 1.554 |

TABLE 16

| Lens | Surface number | Focal length |
|---|---|---|
| L1 | 1-2 | −6.784 |
| L2 | 3-4 | 38.672 |

TABLE 16-continued

| Lens | Surface number | Focal length |
|---|---|---|
| L3 | 6-7 | 8.466 |
| L4 L5 | 8-11 | −19.990 |
| L6 | 12-13 | 13.545 |

TABLE 17

| Group | Surface number | Focal length |
|---|---|---|
| G1 | 1-4 | −11.909 |
| Gf | 12-13 | 13.545 |

EXAMPLE 4

(1) Lens Configuration of Optical System

Figure 8:
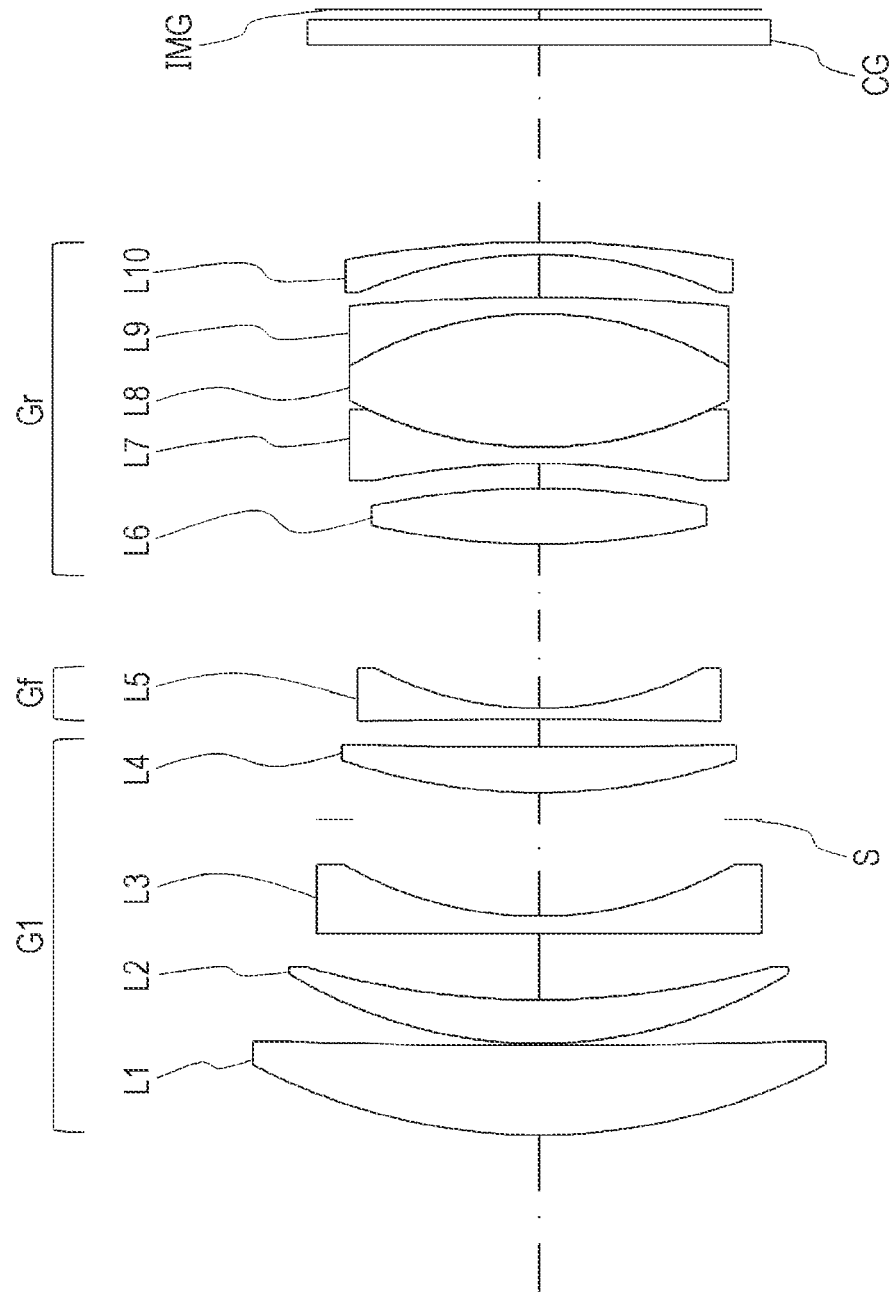
FIG. 8 is a cross-sectional view illustrating a lens configuration example of an optical system of Example 4 of the present invention.

FIG. 8 is a lens cross-sectional view illustrating a configuration of an optical system of Example 4 according to the present invention. The optical system includes an object side lens group G1, a focusing group Gf, and an image side lens group Gr in order from the object side. The object side lens group G1 includes, in order from the object side, a meniscus first lens L1 having positive refractive power and an object side face that is convex toward the object, a meniscus second lens L2 having positive refractive power and an object side face that is convex toward the object, a biconcave third lens L3 having negative refractive power and an object side face and an image-side face that are concave, an aperture stop S, and a meniscus fourth lens L4 having positive refractive power and an object side face that is convex toward the object. The focusing group Gf includes a biconcave fifth lens L5 having negative refractive power and having an object side face and an image side face that are both concave. The image side lens group Gr includes, in order from the object side, a biconvex sixth lens L6 having positive refractive power and having an object side face and an image side face that are both convex, a cemented lens in which a seventh lens L7 having negative refractive power, an eighth lens L8 having positive refractive power, and a ninth lens L9 having negative refractive power are cemented, and a meniscus tenth lens L10 having negative refractive power and having an object side face that is concave toward the object.

Here, the imaging position of the optical system is changed by moving the fifth lens L5 included in the focusing group Gf in the optical axis direction. The tenth lens L10 is a lens having the highest refractive index among lenses having negative refractive power. The second lens L2 is a lens having the largest Abbe number among lenses having positive refractive power. The first lens L1, which is the lens closest to the object, has a negative refractive power.

(2) Numerical Examples

Figure 9:
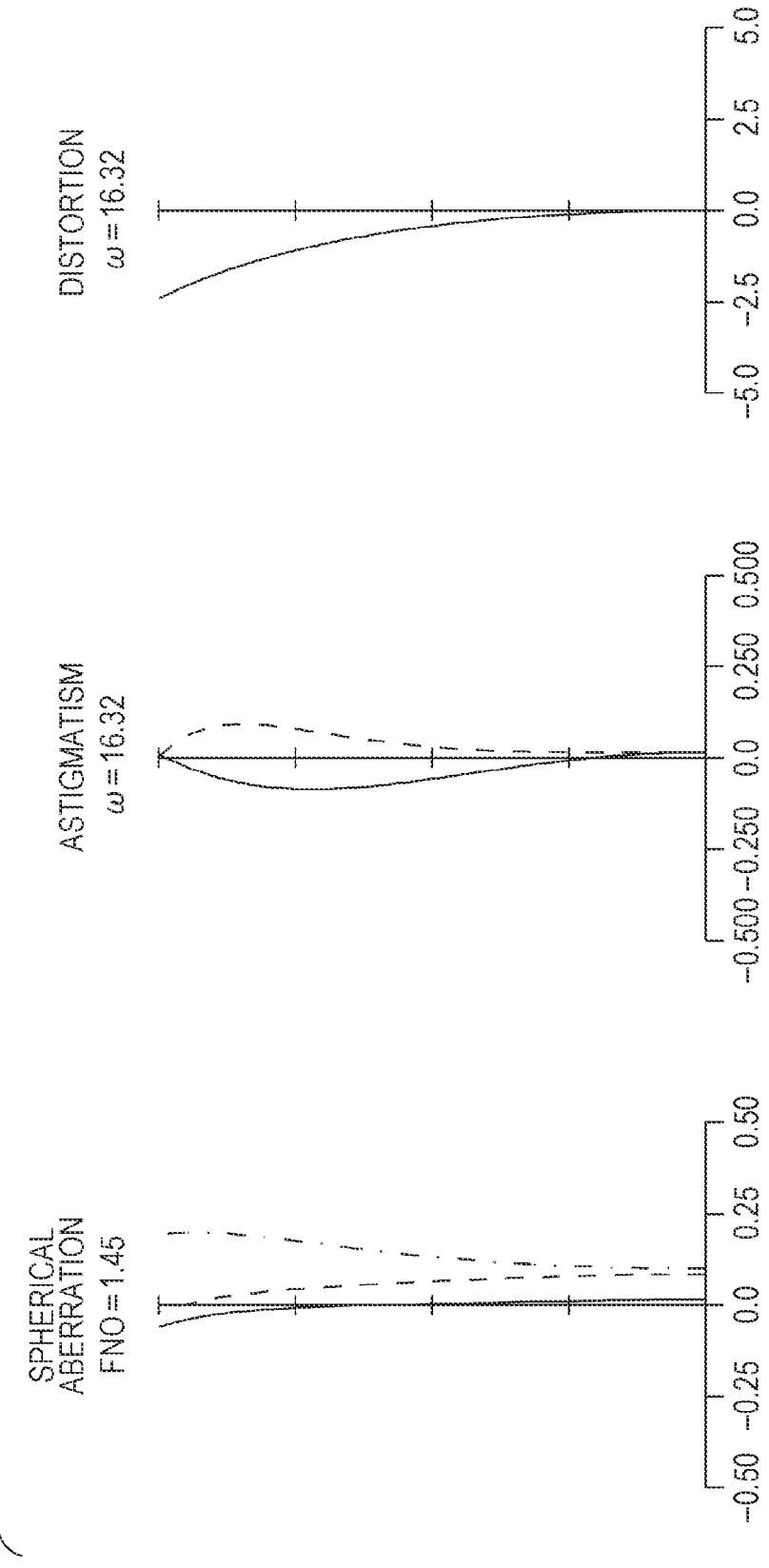
FIG. 9 is a spherical aberration diagram, an astigmatism diagram, and a distortion diagram at the time of imaging a subject at infinity according to Example 4 of the present invention.

Next, numerical examples to which specific numerical values of the optical system used in Example 4 are applied will be described. Tables 18 to 22 show lens data of the optical system, various pieces of data of the optical system, variable interval data, focal lengths of respective lenses, and focal lengths of respective lens groups. FIG. 9 illustrates a longitudinal aberration diagram of the optical system during infinity focus.

TABLE 18

| Surface | r | d | Nd | vd | h |
|---|---|---|---|---|---|
| 1 | 61.5589 | 8.873 | 1.80420 | 46.50 | 26.900 |
| 2 | 785.0877 | 0.215 | | | 26.094 |
| 3 | 47.9893 | 4.340 | 1.72916 | 54.67 | 23.327 |
| 4 | 83.4360 | 6.581 | | | 22.647 |
| 5 | −6985.5575 | 1.730 | 1.78472 | 25.72 | 20.739 |
| 6 | 39.2274 | 9.610 | | | 18.876 |
| 7 | INF | 2.670 | | | 18.450 |
| 8 | 60.8077 | 4.590 | 1.80420 | 46.50 | 18.295 |
| 9 | 997.7238 | D9 | | | 17.998 |
| 10 | −1052.0018 | 1.131 | 1.48749 | 70.44 | 16.799 |
| 11 | 35.4148 | D11 | | | 15.753 |
| 12 | 77.5735 | 5.508 | 1.72916 | 54.67 | 15.000 |
| 13 | −79.5596 | 2.447 | | | 15.437 |
| 14 | −81.5322 | 1.634 | 1.78472 | 25.72 | 15.808 |
| 15 | 40.2990 | 13.290 | 1.98001 | 32.71 | 17.011 |
| 16 | −36.4388 | 1.630 | 1.57522 | 43.85 | 17.537 |
| 17 | −204.3736 | 4.252 | | | 17.502 |
| 18 | −44.1137 | 1.233 | 1.85883 | 30.00 | 17.418 |
| 19 | −107.0057 | 19.587 | | | 17.957 |
| 20 | INF | 2.500 | 1.51633 | 64.15 | 21.280 |
| 21 | INF | 1.000 | | | 21.538 |

TABLE 19

| | |
|---|---|
| Focal length | 75.744 |
| F value | 1.455 |
| Half angle of view | 16.317 |
| Image height | 21.630 |
| Entire lens length | 111.825 |
| BF (in air) | 22.236 |

TABLE 20

Variable interval data

| D0 | INF | 2813.666 | 1080.509 | 663.967 |
|---|---|---|---|---|
| D9 | 2.681 | 5.240 | 9.667 | 14.551 |
| D11 | 16.323 | 13.764 | 9.338 | 4.454 |

TABLE 21

| Lens | Surface number | Focal length |
|---|---|---|
| L1 | 1-2 | 82.608 |
| L2 | 3-4 | 147.312 |
| L3 | 5-6 | −49.705 |
| L4 | 8-9 | 80.345 |
| L5 | 10-11 | −70.257 |
| L6 | 12-13 | 54.674 |
| L7 L8 L9 | 14-17 | 102.745 |
| L10 | 18-19 | −88.192 |

TABLE 22

| Group | Surface number | Focal length |
|---|---|---|
| G1 | 1-9 | 79.895 |
| Gf | 10-11 | −70.257 |
| Gr | 12-19 | 87.949 |

TABLE 23

| | | Example 1 | Example 2 | Example 3 | Example 4 |
|---|---|---|---|---|---|
| (1) | $|(1 - \beta f^2) \times \beta r^2|$ | 0.588 | 1.000 | 0.723 | 0.806 |
| (2) | Ndn | 1.855 | 1.657 | 1.855 | 1.859 |
| (3) | vdp | 70.440 | 55.860 | 63.850 | 54.670 |
| (4) | $|\beta f|$ | 2.271 | 0.000 | 0.526 | 3.145 |
| (5) | fL1/f | −1.811 | −1.356 | −1.336 | — |
| (6) | f × tanω/P | 4406 | 3876 | 4397 | 11087 |
| | βf | 2.271 | 0.000 | 0.526 | 3.145 |
| | βr | 0.376 | 1.000 | 1.000 | 0.301 |
| | fL1 | −20.126 | −11.101 | −6.784 | — |
| | f | 11.112 | 8.187 | 5.077 | 75.744 |
| | ω | 38.418 | 43.437 | 60.000 | 16.317 |
| | P | 0.002 | 0.002 | 0.002 | 0.002 |

In any of Examples, when the imaging position of the optical system is changed, the driving of the focusing group is controlled while monitoring the situation of the moving body according to the procedure illustrated in the flowchart in FIG. 1 by a control device (not illustrated) included in the imaging apparatus. The control device includes a processor, an input/output unit, a storage unit, and the like, and is communicably connected to a drive unit that drives a focusing group. The processor can be configured by, for example, an integrated circuit such as a CPU. The storage unit stores a processing program for grasping the movement situation of the moving body and controlling the driving amount of the focusing group, the setting value, the threshold value, and the like.

When the situation grasping means grasps the situation of the moving body, the driving amount of the focusing group is determined based on the setting value for setting the imaging position according to the situation of the moving body (step S1), and the drive range of the focusing group is set from the threshold value according to the situation of the moving body (step S2). After the focusing group is driven based on the setting value (step S3), it is determined whether the focusing group is located within the drive range set based on the threshold value (step S4). When the focusing group is not located within the predetermined drive range (NG in step S4), the processing from step S3 to step S4 is repeated until it is determined that the focusing group is located within the predetermined drive range (OK in S4). When the focusing group is located within the predetermined drive range (OK in step S4), the situation of the moving body is grasped again (step S5), and it is determined whether there is a change in the situation of the moving body (step S6). When there is a change in the situation of the moving body ("change" in step S6), the procedure similar to that described above is repeated again from step S1, and the focusing group driving amount is determined from the setting value according to the situation of the moving body. When there is no change in the situation of the moving body ("No change" in step S6), the situation of the moving body is monitored until the situation of the moving body changes.

As described above, an imaging apparatus according to the present invention includes a situation grasping means configured to grasp a situation of a moving body, an optical system mounted on the moving body, and a driving means that drives a focusing group configured to change an imaging position of the optical system, wherein a setting value for setting an imaging position according to the situation of the moving body is stored in advance (for example, a storage unit or the like), and the driving means drives the focusing group so as to change the imaging position to a position calculated from the situation of the moving body grasped by the situation grasping means and the setting value, and one or more conditional expressions described above are satisfied.

According to the present invention, it is possible to provide an imaging apparatus that is suitable for an imaging apparatus mounted on the moving body and has high performance and high durability and a moving body.

What is claimed is:

1. An imaging apparatus comprising:
    a processor configured to grasp a situation of a moving body;
    an optical system mounted on the moving body;
    a focusing group configured to change an imaging position of the optical system; and
    an image sensor configured to receive an optical image formed by the optical system and convert the optical image into an electrical image signal, wherein the imaging apparatus satisfies a following condition:

$$500 < f \times \tan \omega / P$$

where
    f is a focal length of the optical system,
    ω is a half angle of view of the optical system, and
    P is a pixel center interval of adjacent pixels of the image sensor,
    wherein the imaging apparatus changes an imaging position to a position calculated from a setting value for setting an imaging position according to a situation of the moving body and a situation of the moving body grasped by the processor, and
    wherein the optical system satisfies a following conditional expression:

$$0.20 < |(1-\beta f^2) \times \beta r^2| < 12.00$$

where
    βf is a lateral magnification of the focusing group, and
    βr is a lateral magnification of a lens group closer to an image than the focusing group.

2. The imaging apparatus according to claim 1, wherein the situation of the moving body grasped by the processor is a speed of the moving body.

3. The imaging apparatus according to claim 1, wherein the situation of the moving body grasped by the processor is a temperature of the moving body.

4. The imaging apparatus according to claim 1, wherein the situation of the moving body grasped by the processor is an altitude of the moving body.

5. The imaging apparatus according to claim 1, wherein a situation of the moving body grasped by the processor is an orientation of the moving body with respect to an optical axis of the optical system.

6. The imaging apparatus according to claim 1, wherein the imaging apparatus has a threshold value for limiting a range of the imaging position according to a situation of the moving body, the threshold value being associated with the situation of the moving body; a drive range of the focusing group is set from the situation of the moving body grasped by the processor and the threshold value.

7. The imaging apparatus according to claim 1, wherein the optical system includes at least one lens having negative refractive power, and satisfies a following conditional expression:

$$1.54 < Ndn < 2.30$$

where
    Ndn is a refractive index of the lens having the negative refractive power with respect to d Line.

8. The imaging apparatus according to claim 1, wherein the optical system includes at least one lens having positive refractive power, and satisfies a following conditional expression:

$$45.0 < vdp < 98.0$$

where
    vdp is an Abbe number of the lens having the positive refractive power with respect to d Line.

9. The imaging apparatus according to claim 1, wherein the optical system satisfies a following conditional expression:

$$|Bf| < 6.00.$$

10. The imaging apparatus according to claim 1, wherein the optical system satisfies a following conditional expression:

$$-10.00 < fL1/f < -0.10$$

where
    fL1 is a focal length of a lens, of the optical system, closest to an object, and
    f is a focal length of the optical system.

11. A moving body comprising the imaging apparatus according to claim 1.

* * * * *